(12) United States Patent
Pace

(10) Patent No.: US 11,133,749 B2
(45) Date of Patent: Sep. 28, 2021

(54) POWER MODULE FOR A CONVERTER OF ELECTRICAL MAGNITUDES

(71) Applicant: Dana TM4 Italia S.r.l., Arzignano (IT)

(72) Inventor: Adolfo Pace, Arzignano (IT)

(73) Assignee: Dana TM4 Italia S.r.l., Arzignano (IT)

( * ) Notice: Subject to any disclaimer, the term of this patent is extended or adjusted under 35 U.S.C. 154(b) by 61 days.

(21) Appl. No.: 16/497,907

(22) PCT Filed: Mar. 27, 2018

(86) PCT No.: PCT/IB2018/052066
§ 371 (c)(1),
(2) Date: Sep. 26, 2019

(87) PCT Pub. No.: WO2018/178855
PCT Pub. Date: Oct. 4, 2018

(65) Prior Publication Data
US 2021/0126545 A1    Apr. 29, 2021

(30) Foreign Application Priority Data
Mar. 27, 2017    (IT) .......................... 102017000033230

(51) Int. Cl.
| | | |
|---|---|---|
| *H02M 7/00* | (2006.01) | |
| *H02M 7/217* | (2006.01) | |
| *H02M 7/5387* | (2007.01) | |
| *H02M 1/088* | (2006.01) | |
| *H02M 7/537* | (2006.01) | |
| *H02M 1/00* | (2006.01) | |

(52) U.S. Cl.
CPC .......... *H02M 7/003* (2013.01); *H02M 1/088* (2013.01); *H02M 7/537* (2013.01); *H02M 1/0054* (2021.05)

(58) Field of Classification Search
CPC ...... H02M 7/003; H02M 7/537; H02M 1/088; H02M 2001/0054; H02M 7/00; H02M 7/02; H02M 7/004; H02M 7/21; H02M 7/217; H02M 7/219; H02M 7/42; H02M 7/44; H02M 7/53; H02M 7/5387; H05K 1/18; H05K 1/181
See application file for complete search history.

(56) References Cited

U.S. PATENT DOCUMENTS

| | | | |
|---|---|---|---|
| 7,505,294 B2* | 3/2009 | Ahmed ................. | H02M 7/003 363/132 |
| 7,881,086 B2* | 2/2011 | Nakayama ............ | H02M 7/003 363/144 |

* cited by examiner

*Primary Examiner* — Gary L Laxton
(74) *Attorney, Agent, or Firm* — McCoy Russell LLP

(57) ABSTRACT

A power module for a converter of electrical magnitudes having an electronic board on which a first electrical circuit is fashioned which defines a positive pole of a direct magnitude, a second electrical circuit is fashioned which defines a negative pole of a direct magnitude, and a third electrical circuit is fashioned which conducts an alternating magnitude. There is one or more first and second electronic switching devices arranged between the first and second electrical circuit, and the third electrical circuit so as to realize the conversion. The first and second electrical circuit are, at least for respective coupling portions, arranged in proximity to the electronic switching devices, neared and superposed at a same face of the board so that a capacitive and/or inductive coupling between the two circuits is realized.

16 Claims, 6 Drawing Sheets

POWER MODULE FOR A CONVERTER OF ELECTRICAL MAGNITUDES

TECHNICAL FIELD

The present invention relates to a power module for a converter of electrical magnitudes such as, for example, an DC/DC or AC/DC or AC/AC inverter or converter (DC=direct current, AC=alternating current). In particular, the power module is configured to generate a phase of an alternating electronic magnitude starting from a direct energy source or vice versa.

Preferably, one or more power modules according to the present invention are applied in an inverter. Therefore, reference will mainly be made below to the case of the inverter without this limiting the present invention to such field of application.

In detail, the present invention is intended for a power module in half-bridge configuration, however it could also be applied to other circuit configurations.

In other words, the idea mainly applies to power modules in half-bridge configuration in which there are two direct inputs or poles (positive and negative), an intermediate input or pole (alternating phase) and two electronic switches.

PRIOR ART

In accordance with what has been realised in the prior art, there are two switches: the high-side switch and the low-side switch.

The high-side switch connects the positive input with the output, while the low-side switch connects the negative input with the output.

The load is connected to the output i.e. in the intermediate point of the branch, between the high-side switch and the low-side switch. Each switch also comprises a control part for receiving the control signal for switching the switch itself on or off.

The switch can be comprised of one or more devices active in parallel, such as MOSFET, IGBT, BJT, GTO etc.

The switches, the input and output circuits are distanced on a board such as, for example, a "PCB" (printed circuit board) of the "direct bonded copper" (DBC) type or the "insulated metal substrate" (IMS) type (these examples of electrical boards mentioned below are only to be considered for purely exemplifying and non-limiting purposes, therefore the board could be of another type not expressly indicated herein). The active devices can be encapsulated (in packages) or bare (bare dies).

Because of the growing needs to adopt increasingly higher switching frequencies (especially to satisfy the needs of multi-pole motors) and the needs to keep the power dissipated by active devices during switch-on and switch-off as low as possible, attempts are currently being made to lower the switch gate resistance values.

However, the switching speed limit value is closely connected with physical magnitudes that are implicit in the configuration of the power module itself.

Such physical magnitudes are called "parasites" and have a strong influence on the wavelengths and on losses during switching.

Normally, to limit these parasitic phenomena, action is taken on the layout of the power module. However, a good circuit design only allows what is already inside the active devices to be marginally increased and the unpleasant effects caused by these parasitic magnitudes to be checked slightly.

The parts that have the highest impact on the module performance are (see FIG. 1) the residual inductances in the "DC loop" and the dispersion inductances in the "AC loop" which are the main cause of voltage peaks. These inductances are charged when the IGBT/Mosfet switch is switched on, which causes overvoltage on the "Lstray" type collector during switch-off. This implies an overall increase in the total power to be dissipated by the switch, which can bring the transistor into the "breakdown" zone and in extreme cases break it.

To solve these problems connected with voltage peaks, two types of solutions are currently adopted:

1—a board layout with Snubbers circuits and uncoupling capacity on the direct part in proximity to the Mosfets/IGBTs. However, this solution is expensive and not always simple to implement, as it depends strongly on the layout of the module and the design constraints. Snubbers also have a dissipative resistive component and a parasitic inductive component which cannot be ignored and that makes the filtering action of the capacitive element of the snubber itself less effective.

2—moving the filter condensers of the direct part closer to the power module and coupling as much as possible the positive and negative plane of the direct part so as to minimise the inductances related to the DC Loop.

However, these solutions do not act on the residual inductances (Residual DC Loop, AC Loop Inductance) inside the power module.

OBJECT OF THE INVENTION

In this situation, the object of the present invention is to realise a power module for inverters which obviates the above-cited drawbacks.

It is in particular an object of the present invention to realise a power module that allows losses to be reduced due to parasitic inductances of the switching components connected in parallel.

It is yet another object of the present invention to realise a power module having more symmetrical electrical behaviour of the active switching components connected in parallel.

The above-indicated objects are substantially attained by a power module according to what is described in the appended claims

BRIEF DESCRIPTION OF THE FIGURES

Further characteristics and advantages of the present invention will more greatly emerge from the detailed description that follows of some preferred but not exclusive embodiments of a power module illustrated in the appended drawings, in which.

DETAILED DESCRIPTION OF ONE OR MORE PREFERRED EMBODIMENTS OF THE INVENTION

Figure 1:
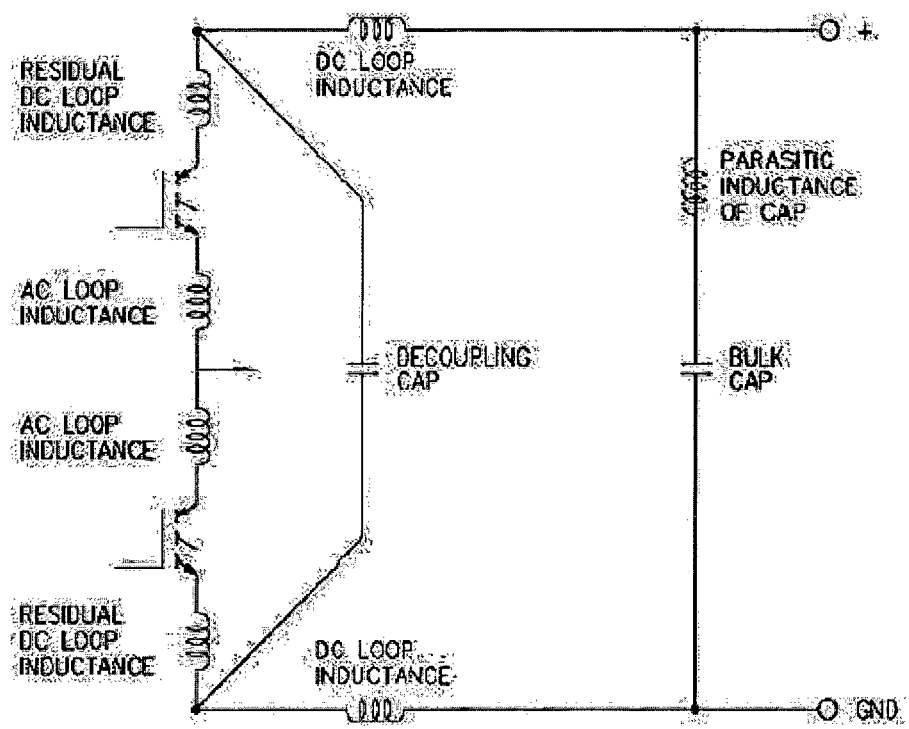
FIG. 1 shows a circuit diagram of the known half-bridge type implemented in a power module.
Figure 2:
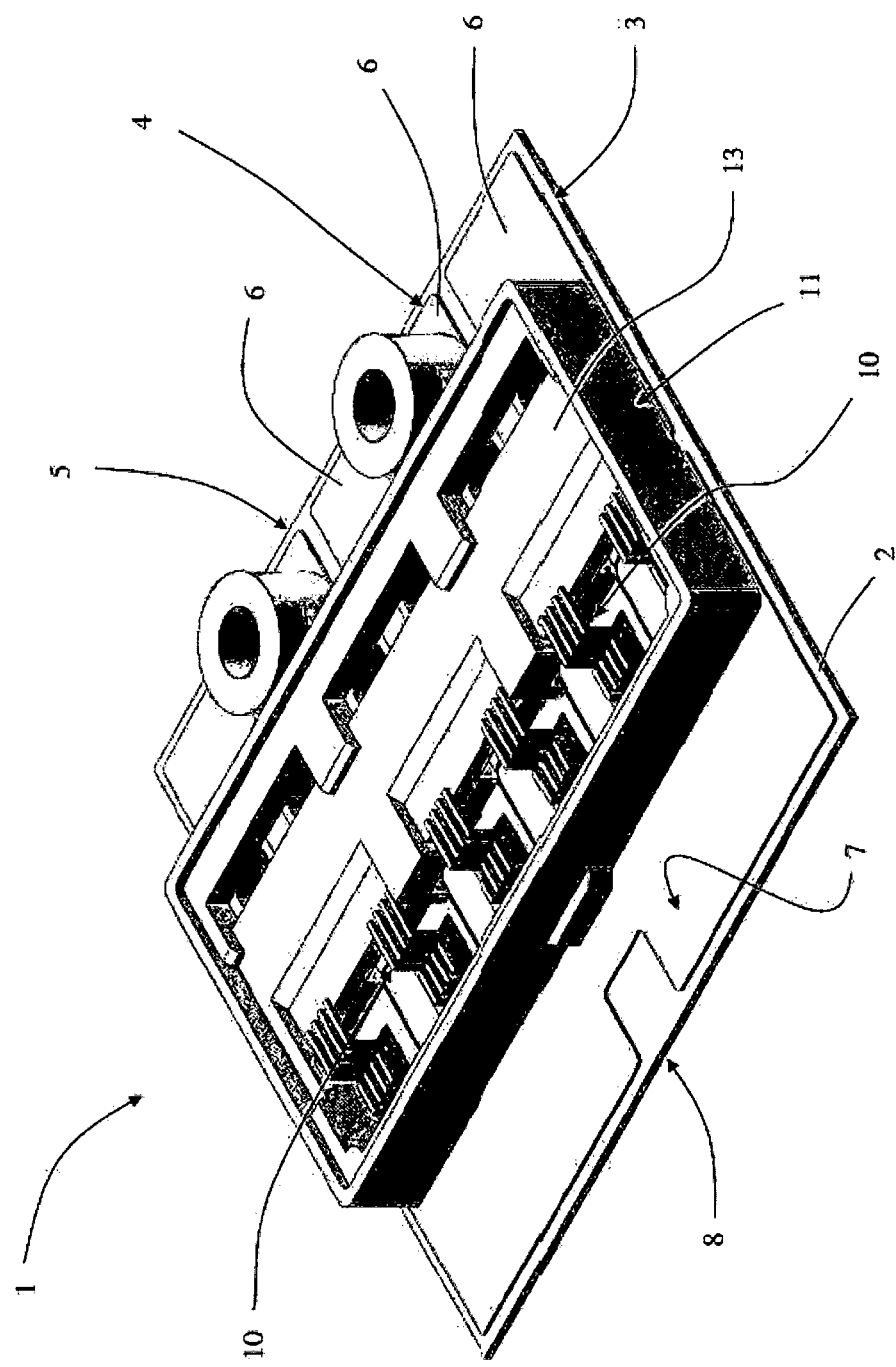
FIG. 2 shows an axonometric view from above of the power module according to the present invention.
Figure 3:
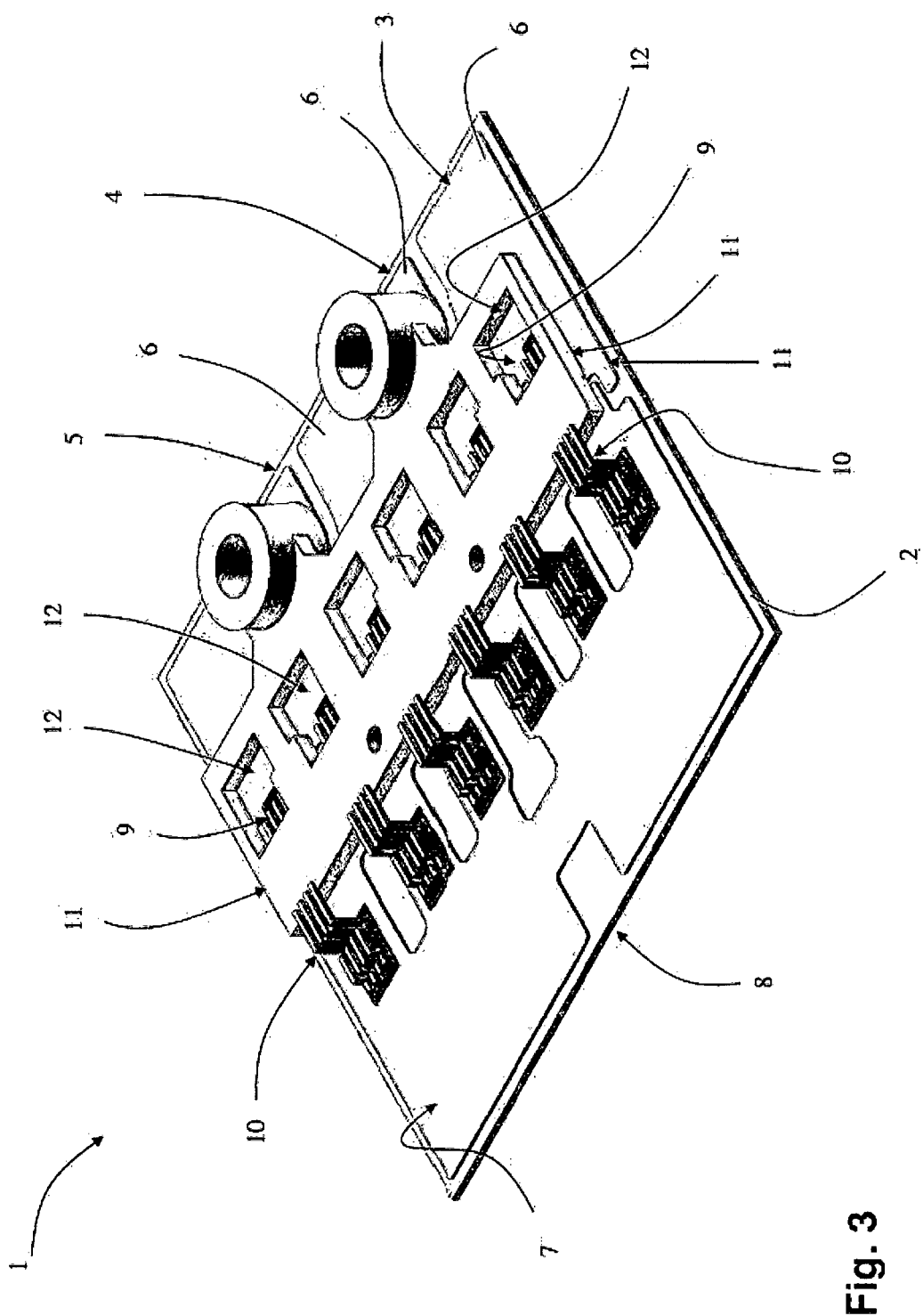
FIG. 3 shows an axonometric view from above of the power module of FIG. 2 with some parts removed to better highlight others.

With reference to the figures mentioned, the number 1 generally denotes a power module for a converter of electrical magnitudes according to the present invention.

In particular, as already set out above, the power module 1 is preferably used in an electronic inverter to generate a phase of an alternating electronic magnitude (alternating current/voltage) starting from a direct energy source (e.g. accumulator or battery).

However, the power module could be used in any other type of converter (DC/DC or AC/DC or AC/AC). Furthermore, the power module as such could operate both in one conversion direction and in the other, i.e. from direct magnitudes to alternating or from alternating to direct.

In the present description provided below, reference will mainly be made to the case in which the module 1 generates one of the phases of alternating current produced starting from direct magnitudes, but without thereby being limited to such conversion direction.

The power module 1 comprises a flat electronic board 2, preferably a PCB (printed circuit board) on which the circuits described below are printed. Such board 2 is preferably made of electrically insulating and thermally dissipating material so as to dissipate the heat produced by the electronic components. Preferably the board 2 comprises alumina.

In particular, the module 1 comprises a first electrical circuit 3 (preferably the input circuit) fashioned on the board 2 and connected in use to a positive pole of the direct energy source. Such first electrical circuit 3 is preferably of the flat type and is directly connected to the board 2 (the first circuit 3 is also defined as the "battery baseplate").

Furthermore, the module 1 comprises a second electrical circuit 4 (preferably the input circuit) mounted on the board 2 and separate from the first (the two circuits are electrically insulated) and connected in use to a negative pole of the direct energy source. Such second electrical circuit 4 has a preferably flat extension and is preferably made of one or more conducting materials so as to guarantee a low electrical resistance (the second circuit 4 is also defined as the "bus bar").

Preferably, the first 3 or the second 4 electrical circuit, and the third electrical circuit 7 are mounted on a same and single insulating layer (preferably planar) comprised in the board 2 itself.

Furthermore, said one or more electronic switching devices 9 and said one or more second electronic switching devices 10 are mounted on such same and single insulating layer (preferably planar) comprised in the board 2 itself.

Advantageously, various superposed insulating layers of the board 2 are not necessary.

As can be seen from the appended figures, each first and second circuit extends from a first side 5 of the board 2 to about half way along the surface extension of the board 2 itself.

In detail, each first and second circuit has one or more connecting portions 6 for the connection with the cables that carry the direct current/voltage signal. Such connecting portions 6 are arranged at the first side 5 of the board 2.

Each connecting portion 6 comprises a terminal to which the related cable is connected or it is directly connected to a direct magnitude conduction bus (DC-BUS).

Furthermore, the power module 1 comprises a third electrical circuit 7 mounted on the board 2 and separate (electrically insulated) from the first and from the second electrical circuit 4. Preferably, the third electrical circuit 7 has a planar extension and is connected to the board 2.

As can be seen from the appended figures, the third electrical circuit 7 extends from about half way along the surface extension of the board 2 to a second side 8 of the board 2 opposite the first.

The direction that goes from the first side 5 to the second side 8 is defined as the transformation direction of the electrical magnitudes of the converter and, preferably, of the inverter.

Furthermore, the power module 1 comprises one or more first electronic switching devices 9 arranged between the first electrical circuit 3 and the third electrical circuit 7 so as to realise a switching of an electrical signal originating from the first electrical circuit 3. Preferably, each electronic switching device is an active device such as, for example, a Mosfet, IGBT, BJT, GTO, . . . .

In the preferred case represented in the appended figures, there is a plurality of first electronic switching devices 9 arranged in parallel.

Furthermore, the power module 1 comprises one or more second electronic switching devices 10 arranged between the second electrical circuit 4 and the third electrical circuit 7 so as to realise a switching of an electrical signal originating from the second electrical circuit 4.

Also in this case, each electronic switching device is preferably an active device such as, for example, a Mosfet, IGBT, BJT, GTO, . . . .

In the preferred case represented in the appended figures, there is a plurality of second electronic switching devices 10 arranged in parallel, preferably the same number as the first electronic switching devices 9.

Furthermore, the power module 1 comprises a control unit (driver) connected to the first and to the second electronic switching devices 10 and configured to send to the latter one or more control signals so as to govern the opening and closing times of the switches during operation for the realisation of the phase according to known techniques.

It is also to be noted that the first circuit 3 (preferably the input circuit) and the second circuit 4 (preferably the input circuit) have respective coupling portions 11 (the meaning of the latter term will be explained below) arranged in proximity to the first or to the second electronic switching devices 10. In other words, the coupling portions 11 of the first and second circuit are parts of circuit that are arranged downstream of the connecting portions 6 and in proximity to the electronic switching devices.

In accordance with the present invention, the first and the second electrical circuit 4 are, at least at the respective coupling portions 11, neared and superposed according to a perpendicular direction to the board 2 itself so that a capacitive and inductive coupling between the two circuits is realised (from an external point of view to the circuit the two currents of the direct magnitudes always travel in the same direction).

In other words, the coupling portions 11 of the two circuits (preferably the input circuit) are facing each other and slightly distanced. In this way, the detrimental effects of the residual inductances of the "DC loop" and of the "AC loop" are minimised. Furthermore, the structure that is realised is symmetrical from an electrical point of view. It is to be noted that the closer the two portions are (but without touching each other) the more effective the coupling is.

In particular, the first and the second electrical circuit 4 are both arranged at a first half of the board 2, while the third electrical circuit 7 is arranged at a second half of the board 2 opposite the first according to a transformation direction of the electrical magnitudes of the inverter.

Preferably, the coupling portion 11 of an electrical circuit (preferably the input circuit) is vertically distanced with respect to the board 2, and the coupling portion 11 of the other electrical circuit (preferably the input circuit) is arranged in contact with the board 2 itself.

In other words, the coupling portions 11 of the two circuits are vertically distanced from each other and are insulated preferably only by the air.

In particular, the first switching device 9 is substantially arranged planar as the plane of the first circuit 6 is coplanar to the plane of the output circuit 7. The second switching device 10 has an oblique and vertical extension as it is connected between the coupling portion which is raised with respect to the board and the output circuit which is arranged at the same level as the board. In other words, the second switching device 10 is conformed like a bridge between the coupling portion at the top and the output circuit 7 at the bottom.

It is to be noted that the third electrical circuit 7 is arranged downstream of the first 3 and of the second electrical circuit 4 according to a rectilinear transformation direction of the electrical magnitudes of the converter. Furthermore, said one or more second electronic switching devices 10 are arranged downstream of said one or more first electronic switching devices 9 according to a rectilinear transformation direction of the electrical magnitudes of the converter so that the respective electrical currents flow along a same transformation direction.

In other words, the first 3, the second 4, and the third 7 electrical circuits are arranged so that the electrical currents that flow from the input towards the output are parallel and one-directional. In particular, the current at the output from the second electronic devices 10 is parallel to the input currents to the first 9 and second 10 electronic devices.

Advantageously, the electrical currents that go from the first 3 and/or the second 4 electrical circuit towards the third circuit 7 follow a rectilinear transformation direction of the electrical magnitudes.

Figure 5:
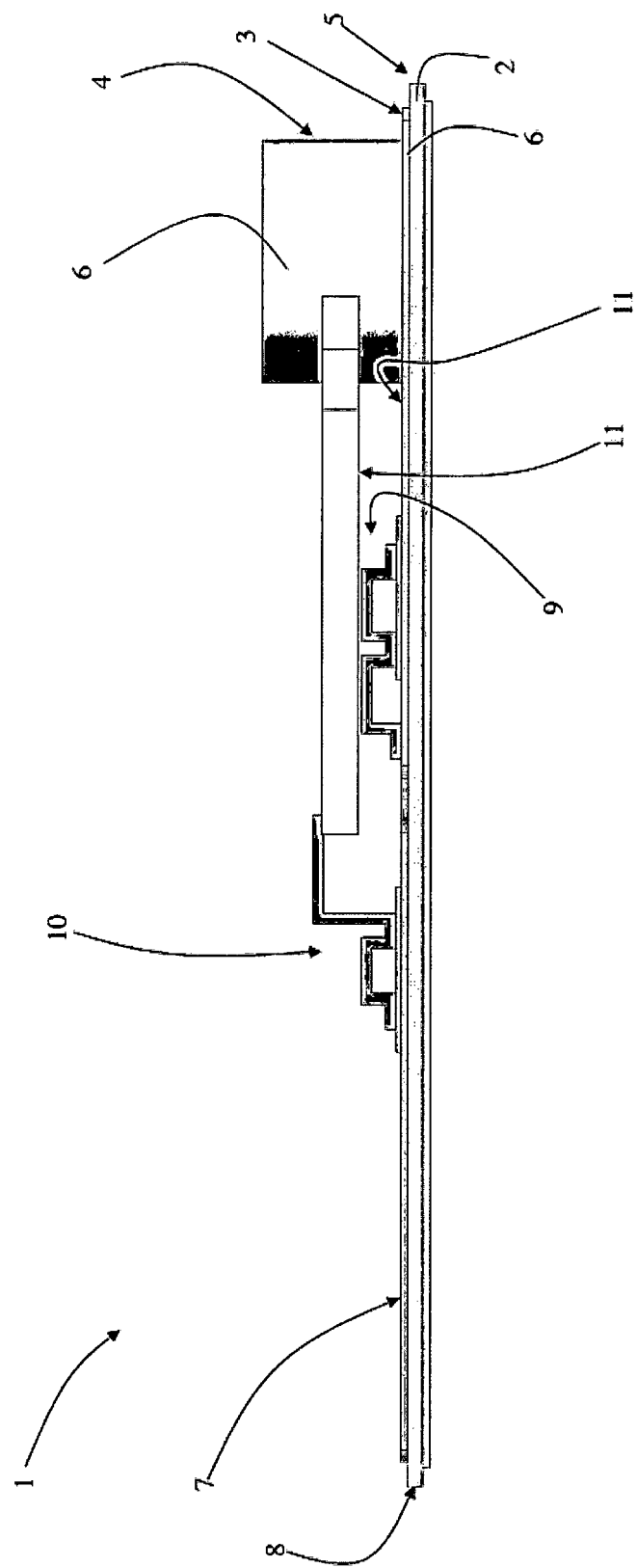
FIG. 5 shows a lateral view from above of the power module of FIG. 3.

In detail, the coupling portion 11 that is vertically distanced with respect to the board 2 is superposed on the electronic switching devices connected to the coupling portion 11 of the other electrical circuit (preferably the input circuit) so as to cover the electronic switching devices (FIG. 5).

In other words, the two circuits (preferably the input circuits) are arranged on the same side of the board 2 so as to realise the coupling.

Figure 4:
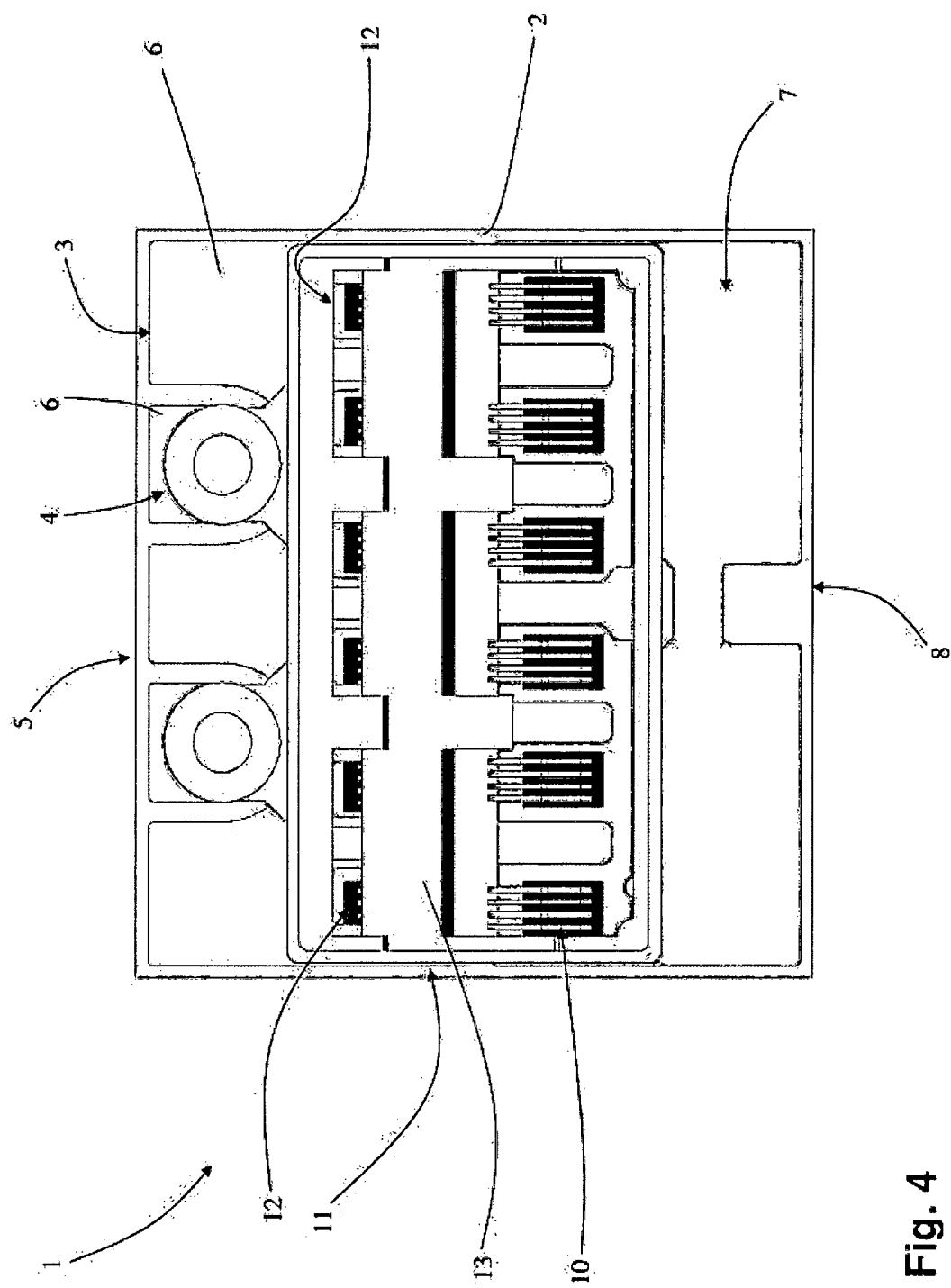
FIG. 4 shows a view from above of the power module of FIG. 3.

In particular, the coupling portion 11 that is vertically distanced with respect to the board 2 has holes 12 (or windows) at the vertical projection of the electronic switching devices arranged below it so as to increase the coupling between the two portions (FIG. 4).

With reference to the first side 5 of the board 2 the first and second electrical circuits 4 have respective connecting portions 6 arranged in an alternated fashion along the width direction of the board 2. The appended figures show five connecting portions 6 two of which belong to the first circuit 3 (preferably the input circuit) and two belong to the second circuit 4 (preferably the input circuit).

Furthermore, the respective connecting portions 6 of the first and the second circuit 4 have different heights with respect to the board 2 so that the respective coupling portions 11 are arranged at different heights with respect to the board 2. In particular, the connecting portion 6 of the first circuit 3 has a different height and is raised above the connecting portion 6 of the second circuit 4 so that the two circuits are at different heights.

Furthermore, the module 1 comprises a layer 13 of electrically insulating material arranged between the coupling portions 11 of the respective electrical circuits (preferably the input circuits). Preferably, such layer 13 of insulating material is box-formed and encloses the coupling portion 11 vertically distanced with respect to the board 2. In other words, the coupling portion 11 of the electrical circuit distanced from the board 2 is contained in the box of insulating material. Such insulating material is preferably plastic.

Finally, it is to be noted that the electrical circuits (preferably the input circuits) and output circuits 7 and the electronic switching devices are arranged above a same face of the board 2.

Furthermore, the first electronic switching devices 9 are arranged equidistant with respect to the electrical bus connected to the electrical connecting portions 6 of said first and said second electrical circuit 3, 4 so as to guarantee an equal path of the electrical current.

Preferably, the second electronic switching devices 10 are arranged equidistant with respect to the second side of the board 2 in which the electrical connections of third electrical circuit 7 are arranged so as to guarantee an equal path for the electrical current.

Finally, it is to be noted that each of said second electronic switching devices 10 is substantially aligned with a respective first electronic switching device 9 according to a rectilinear transformation direction so as to define various straight lines parallel and perpendicular to the transformation direction.

The subject matter of the present invention is also an electronic inverter for generating an alternating electrical current signal (with various phases) starting from a direct electrical current signal (e.g. originating from a battery or accumulator). The inverter comprises a plurality of power modules described above in which said power modules are in a same number as the phases of the inverter. Furthermore, the input circuits of the modules are connected in parallel so as to define the inputs of the inverter.

The inverter and the power modules derive directly from the above description which is incorporated below in its entirety.

The present invention reaches the set objects.

Figure 6:
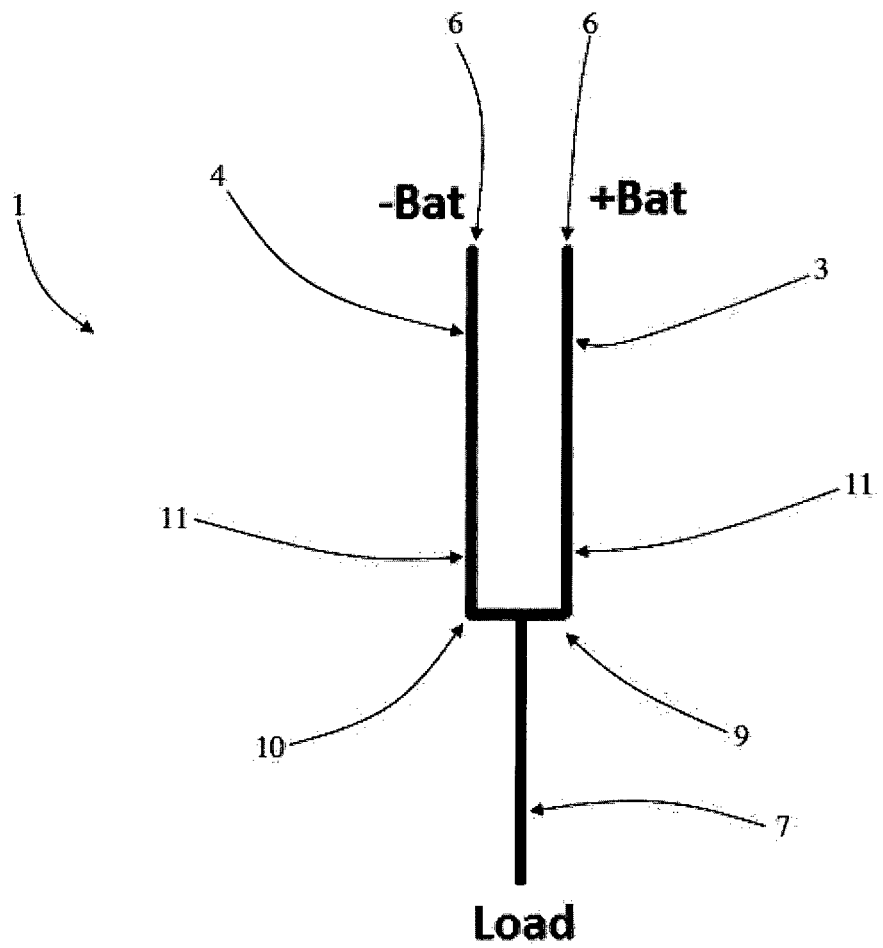
FIG. 6 shows a schematic representation of the power module according to the present invention.

In particular, the present invention allows losses to be reduced due to parasitic inductances of the switching components connected in parallel. In fact, thanks to the configuration according to the present invention, the current flows (with different directions and intensities according to the time at which it is observed) through the first or second input circuit 4 (according to whether the current flows upwards or downwards through the Mosfets/IGBTs) and the two paths of the input circuits are coupled (FIG. 6).

In this way, the planes related to the positive and negative pole of the battery are coupled directly inside the power module 1 in proximity to the active switching devices (Mosfets/IGBTs). In this way, the detrimental effects of the residual inductances of the DC loop and the inductances of the AC loop are advantageously minimised. In this way, the gate resistances of the driver can be reduced hence significantly reducing switching losses, while keeping overvoltages on the Lstray di/dt collector within the limit values.

In other words, as the input and output circuits and the switching devices are arranged at a same face of the board, and the second input circuit is superposed with the first, only one insulating barrier will be present and not two (as happened in the prior art in which the second input circuit was arranged below the board and a further insulating layer had to be added) reducing the thermal resistance seen by the switching devices.

Also worthy of note is that the present invention is relatively easy to realise and also that the cost connected to the actuation of the invention is not very high.

The invention claimed is:

1. A power module for a converter of electrical magnitudes, comprising:
   an electronic circuit board;
   a first electrical circuit mounted on the board and configured for defining a positive pole of a direct electrical magnitude;
   a second electrical circuit mounted on the board and separated from the first and configured for defining a negative pole of said direct electrical magnitude;
   a third electrical circuit mounted on the board and separated from the first and the second electrical circuit and configured for conducting an alternating electrical magnitude;
   one or more first electronic switching devices arranged between the first electrical circuit and the third electrical circuit so as to realize a switching of an electrical signal originating from the first electrical circuit;
   one or more second electronic switching devices arranged between the second electrical circuit and the third electrical circuit so as to realize a switching of an electrical signal originating from the second electrical circuit, so that the first and the second electronic switching devices realize a conversion of the direct magnitude into an alternating magnitude or vice versa;
   said first and said second electrical circuits are, at least for respective coupling portions, arranged in proximity to the first and second electronic switching devices, neared and superposed according to a perpendicular direction to the board itself and are arranged at a same face of the board so that a capacitive and/or inductive coupling between the first and second electrical circuits is realized;
   said coupling portion of the first or second electrical circuit being vertically distanced with respect to the board, and the coupling portion of the second or first electrical circuit being arranged in contact with the board itself;
   wherein said coupling portion of the first or second electrical circuit that is vertically distanced with respect to the board is vertically superposed on the electronic switching devices connected to the coupling portion of the other of the first or second electrical circuit arranged in contact with the board itself so as to increase a coupling effect between the coupling portion and the other coupling portion; said third electrical circuit being arranged downstream of the first and of the second electrical circuit according to a rectilinear transformation direction of the electrical magnitudes of the converter, and said one or more second electronic switching devices being arranged downstream of said one or more first electronic switching devices according to the rectilinear transformation direction of the electrical magnitudes of the converter so that respective electrical currents flow along a same transformation direction.

2. The power module according to claim 1, wherein the first and second electrical circuit are both arranged at a first side of the board, said third electrical circuit being arranged at a second side of the board opposite the first side in which said first and second side are defined along an extension surface of the board itself with respect to a transformation direction of the electrical magnitudes of the converter.

3. The power module according to claim 2, wherein the first and second electrical circuit have respective connecting portions arranged in an alternated fashion along the first side of the board.

4. The power module according to claim 3, wherein the respective connecting portions of the first and the second circuit have different heights with respect to the board so that the respective coupling portions are arranged at different heights with respect to the board.

5. The power module according to claim 1, wherein said coupling portion that is vertically distanced with respect to the board, has holes at a vertical projection of the electronic switching devices arranged below said coupling portion.

6. The power module according to claim 1, further comprising a layer of insulating material arranged between the coupling portions of the first and second electrical circuits.

7. The power module according to claim 6, wherein said layer of insulating material is box-formed and encloses the coupling portion vertically distanced with respect to the board.

8. The power module according to claim 1, wherein the electrical circuits and the electronic switching devices are arranged at a same face of the board.

9. The power module according to claim 1, wherein said first and said second electrical circuit and the third electrical circuit are mounted on a same insulating layer comprised in the board itself.

10. The power module according to claim 1, wherein said one or more first electronic switching devices and said one or more second electronic switching devices are mounted on a same insulating layer comprised in the board itself.

11. The power module according to claim 1, wherein the first and the second electrical circuit define an input for the direct electrical magnitudes and can be connected to respective poles of a direct current source;
   said third electrical circuit defining an output for the alternating electrical magnitudes following the conversion of the direct magnitude into an alternating magnitude or vice versa.

12. The power module according to claim 1, wherein said board comprises a single insulation layer on which said first or second electrical circuit and the third electrical circuit are mounted.

13. The power module according to claim 1, wherein said first electronic switching devices are arranged equidistant with respect to a first side of the board in which electrical connecting portions of said first and said second electrical circuit are arranged.

14. The power module according to claim 1, wherein said second electronic switching devices are arranged equidistant with respect to a second side of the board in which electrical connecting portions of said third second electrical circuit are arranged.

15. The power module according to claim 1, wherein each of said second electronic switching devices is substantially aligned with a respective first electronic switching device according to a rectilinear transformation direction.

16. The power module according to claim 11, wherein said power modules are in a same number as the phases of an inverter;
   the first and second circuits, including input circuits, of the modules are connected in parallel to one another.

* * * * *